US008926004B2

(12) United States Patent
Betzen et al.

(10) Patent No.: US 8,926,004 B2
(45) Date of Patent: Jan. 6, 2015

(54) MOTOR VEHICLE TROUGH MODULE WITH SEAL

(71) Applicant: GM Global Technology Operations LLC, Detroit, MI (US)

(72) Inventors: Heiko Betzen, Bausendorf (DE); Markus Frommann, Bingen am Rhein (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/090,363

(22) Filed: Nov. 26, 2013

(65) Prior Publication Data

US 2014/0183898 A1    Jul. 3, 2014

(30) Foreign Application Priority Data

Nov. 28, 2012    (DE) .................... 10 2012 023 655

(51) Int. Cl.
*B60S 1/04*    (2006.01)
*B62D 25/24*    (2006.01)
*B60K 15/05*    (2006.01)

(52) U.S. Cl.
CPC ............ *B62D 25/24* (2013.01); *B60K 15/05* (2013.01)
USPC ....................................... 296/192

(58) Field of Classification Search
CPC ........ C21D 9/673; C21D 9/663; F27B 11/00; F27D 99/0073; E04B 9/02; B01D 29/012; B01D 29/05; B01D 29/085; B29C 66/92611; B29C 2045/14459

USPC ............................................. 296/192, 97.22
See application file for complete search history.

(56) References Cited

U.S. PATENT DOCUMENTS

| 4,525,004 A   | 6/1985 | Tanaka |
|---|---|---|
| 4,718,713 A * | 1/1988 | Sakamoto et al. ............ 296/192 |
| 4,892,351 A * | 1/1990 | Ono et al. ..................... 296/213 |
| 4,938,526 A * | 7/1990 | Sannomiya et al. .......... 296/192 |
| 5,120,106 A * | 6/1992 | Sakurai et al. .......... 296/193.02 |
| 6,193,305 B1* | 2/2001 | Takahashi ..................... 296/192 |
| 6,923,286 B2* | 8/2005 | Sato et al. ..................... 180/274 |
| 7,219,953 B2* | 5/2007 | Mori ............................. 296/192 |
| 7,552,964 B2* | 6/2009 | Saito ............................. 296/192 |
| 8,002,335 B2* | 8/2011 | Usuda ........................... 296/192 |

(Continued)

FOREIGN PATENT DOCUMENTS

| DE | 1653956 A1    | 5/1971 |
|---|---|---|
| DE | 4307454 C1    | 4/1994 |
| DE | 19612098 A1   | 10/1996 |
| DE | 102004003073 A1 | 8/2005 |

OTHER PUBLICATIONS

German Patent Office, German Patent Search Report for Application No. 102012023655.7 mailed Sep. 10, 2013.

*Primary Examiner* — Kiran B Patel
(74) *Attorney, Agent, or Firm* — Ingrassia Fisher & Lorenz, P.C.

(57) ABSTRACT

A trough module is provided for attachment to the body of a motor vehicle, in particular a passenger car, which can be sealed by a cover that can be locked by a bolt. The trough module exhibits a wall with a passage opening through which the bolt can pass. The passage opening incorporates a seal, which is molded, in particular injection molded, with the wall.

9 Claims, 1 Drawing Sheet

(56) References Cited

U.S. PATENT DOCUMENTS

| | | |
|---|---|---|
| 8,474,901 B2 * | 7/2013 | Serizawa et al. ............... 296/192 |
| 8,641,130 B2 * | 2/2014 | Morden et al. ........... 296/187.04 |
| 2002/0060475 A1 * | 5/2002 | Kim .............................. 296/192 |
| 2003/0178873 A1 * | 9/2003 | Kato et al. .................... 296/192 |
| 2005/0134089 A1 * | 6/2005 | Borkowski et al. ........... 296/192 |
| 2005/0179285 A1 * | 8/2005 | Nakajima et al. ............. 296/192 |
| 2006/0016814 A1 | 1/2006 | Gramss et al. |
| 2009/0146459 A1 * | 6/2009 | Watanabe et al. ............. 296/192 |
| 2010/0301055 A1 | 12/2010 | Zentner |
| 2011/0049933 A1 * | 3/2011 | Serizawa et al. .............. 296/192 |
| 2012/0161462 A1 | 6/2012 | Zentner |
| 2013/0057027 A1 * | 3/2013 | Matsubara ..................... 296/192 |
| 2013/0181482 A1 * | 7/2013 | Suzaki et al. ................. 296/192 |
| 2013/0214560 A1 * | 8/2013 | Sasaki ........................... 296/192 |
| 2013/0221705 A1 * | 8/2013 | Sugishima et al. ........... 296/192 |
| 2013/0300154 A1 * | 11/2013 | Schaefer ....................... 296/192 |
| 2013/0320712 A1 * | 12/2013 | Murofushi et al. ........... 296/192 |
| 2013/0341968 A1 * | 12/2013 | Wolff et al. ................... 296/192 |
| 2014/0175835 A1 * | 6/2014 | Miyamoto et al. ............ 296/192 |

* cited by examiner

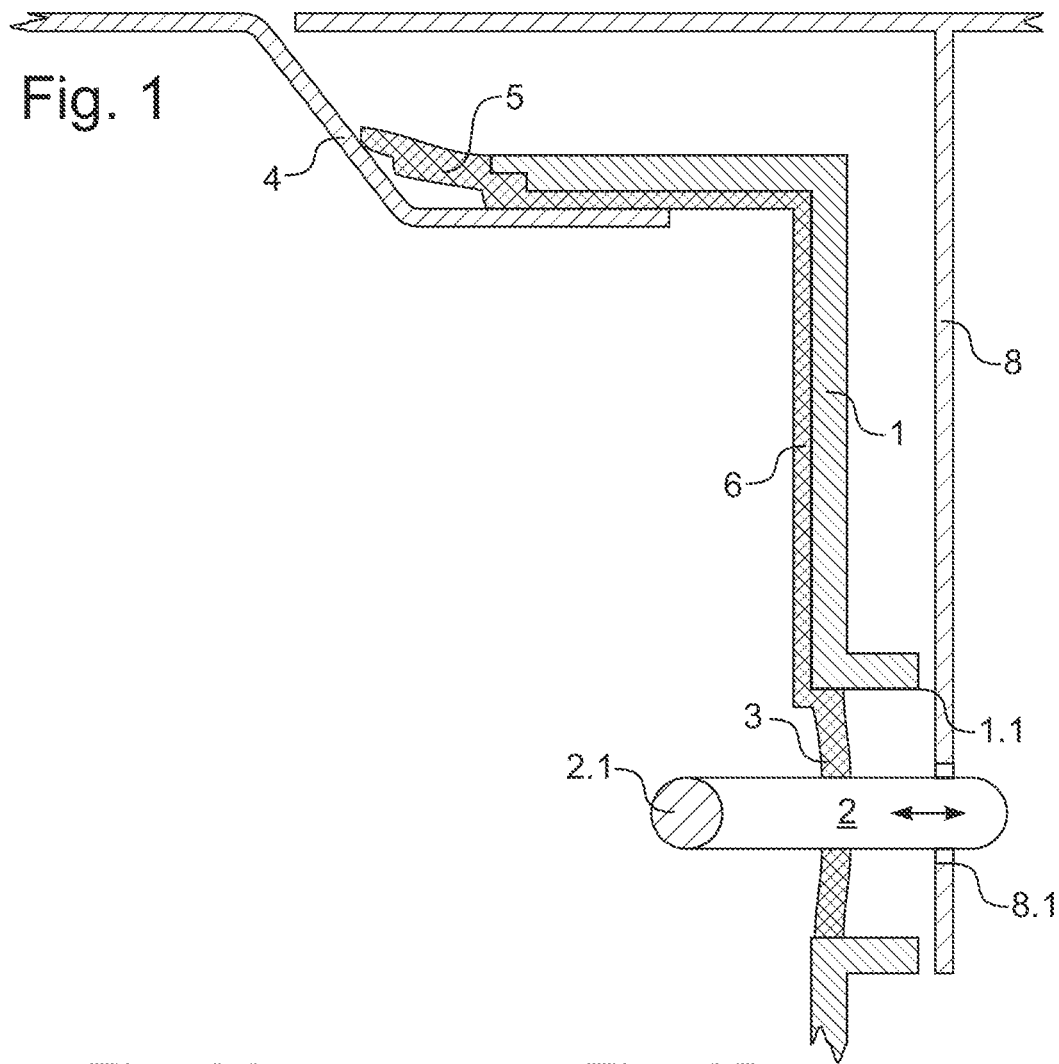
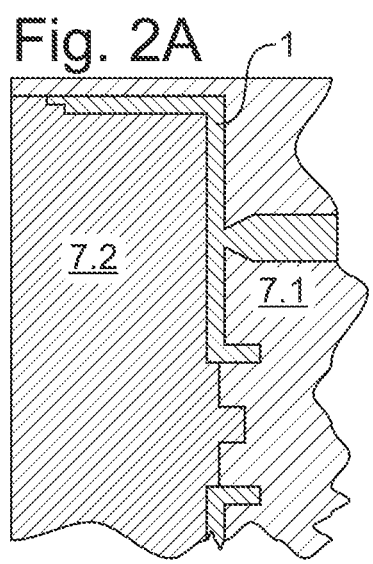
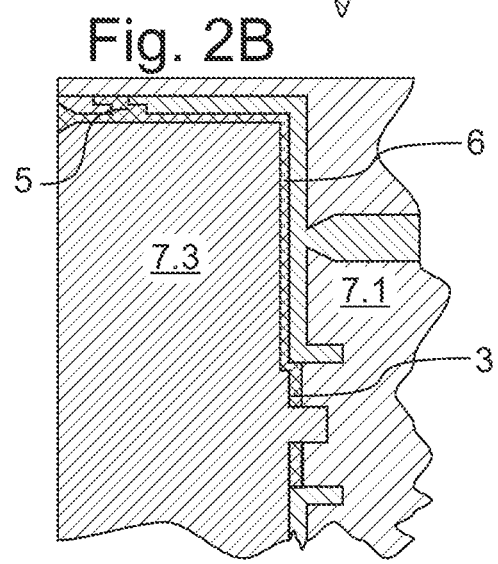

MOTOR VEHICLE TROUGH MODULE WITH SEAL

CROSS-REFERENCE TO RELATED APPLICATION

This application claims priority to German Patent Application No. 10 2012 023 655.7, filed Nov. 28, 2012, which is incorporated herein by reference in its entirety.

TECHNICAL FIELD

The technical field relates to a trough module with seal, which is provided for attachment to the body of a motor vehicle, and can be sealed by a cover that can be locked by a bolt, a trough module arrangement with such a trough module, a motor vehicle with such a trough module arrangement, as well as a method for manufacturing such a trough module.

BACKGROUND

Known from DE 19612 098 A1 is a device for locking a cover, which can be used to cover a trough in a vehicle body, with a locking element that can be moved back and forth in a pipe sleeve of a guiding body. Penetrating dust can impair the function of such a locking element.

At least one object is to provide an improved motor vehicle. In addition, other objects, desirable features and characteristics will become apparent from the subsequent summary and detailed description, and the appended claims, taken in conjunction with the accompanying drawings and this background.

SUMMARY

A motor vehicle, in particular a passenger car, is provided that comprises a body and trough module arrangement according to another embodiment, which can be secured to the body detachably, in particular via latching and/or bolting, or undetachably, in particular via adhesive bonding, welding and/or caulking. In particular, a detachable attachment can facilitate disassembly, while an undetachable one can improve the strength.

In an embodiment, the trough module arrangement exhibits a cover mounted so that it can move, in particular pivot, relative to the body, a trough module according to another aspect of the present invention, and a bolt for locking the cover. In an embodiment, the trough module incorporates a tank opening, in particular a filler neck, for filling the motor vehicle with fuel and/or lubricant. Additionally or alternatively, an embodiment can provide the trough module with an electrical plug for charging the energy storage unit in the motor vehicle. Accordingly, the cover can in particular be a tank cover of a motor vehicle for sealing the trough module or a trough defined by the latter.

According to an embodiment, a trough module is provided or equipped for attachment, in particular detachable or undetachable attachment, to the body of a motor vehicle, and can be sealed by a cover that can be locked with a bolt. The trough module exhibits a wall that in one embodiment is designed like a trough or exhibits or defines a trough. A tank opening and/or an electrical plug can be provided on the wall.

The wall exhibits a passage opening through which the bolt can pass. In a locked state, the bolt passing through the passage opening can in one embodiment positively engage a back cut, in particular a hook or recess, of the cover from the rear, so as to lock the latter. In an unlocked state, the bolt can also pass through the passage opening, but be spaced apart from the cover. Likewise, the bolt in an unlocked state can be completely retracted from the passage opening or not pass through the latter. The passage opening can exhibit in particular an annular flange, especially for protecting the bolt.

In an embodiment, the passage opening incorporates a seal that contacts and seals the lock at least in a locked state. In an embodiment, the seal can contact the bolt at least in the locked state at least essentially along its entire periphery, or exhibit a passage opening with an inner edge that tightly abuts against the bolt to diminish the transfer of in particular dust-like solids and/or liquid. Likewise, the inner edge can tightly contact only sections of the bolt in a locked state. In a further development, the inner edge of the seal is elastically expanded by the bolt that passes through it, and thereby pre-stressed against the bolt. In one embodiment, this in particular allows the seal to perform a stripping function on the bolt, preferably stripping dust and/or liquid from the latter as the bolt moves relative to the seal. In an embodiment, the seal can prevent or at least reduce penetration by dust and/or liquid between the bolt and a guide, and thereby improve their functionality.

In an embodiment, the seal is molded, in particular injection molded, together with the wall. In this way, the seal can in one embodiment is secured to the wall, in particular tightly, rattle-free, and captively.

In an embodiment, the wall and seal can be fabricated through multi-component molding, in particular in a so-called two-shot method, in which first the wall and then the seal or first the seal and then the wall are molded, in particular injection molded. In a further embodiment, the wall and seal can be molded, in particular injection molded, using conversion, turning and/or displacement techniques. One or more tool or molded elements and/or components or semi-finished products are converted or replaced (conversion technique), rotated (turning technique) and/or shifted (displacement technique) in a new position between the step of molding the wall and the subsequent or preceding step of molding the seal. Likewise, the wall and seal can be molded, in particular injection molded, with the core retraction technique, wherein a tool or molded element (core) is retracted after molding the wall or seal to create space for the subsequently molded seal or wall. In an embodiment, this method can be advantageously used to efficiently fabricate the trough module.

In an embodiment, the trough module can exhibit a peripheral seal for sealing the trough module against the body of the motor vehicle. In a further development, this peripheral seal can be molded, in particular injection molded, together with the seal arranged in the passage opening. In an embodiment, the seal arranged in the passage opening and the peripheral seal for sealing the trough module against the body are together molded, in particular injection molded, via an overflow channel. In a further embodiment, an overflow web molded by this overflow channel can be arranged on an exterior side of the wall facing away from the cover, in particular materially bonded thereto. In an embodiment, the wall exhibits a plastic, in particular a thermoplastic and/or duroplastic, and has the latter in a further embodiment. In a further embodiment, the wall exhibits acrylonitrile butadiene styrene (ABS), polyamide (PA), polylactate (PLA), polymethylmethacrylate (PMMA), polycarbonate (PC), polyethylene terephthalate (PET), polypropylene (PP), polystyrene (PS) and/or polyetheretherketone (PEEK), in particular PP GF20. These plastics, in particular hard or stiff plastics, can advantageously define a dimensionally stable trough in an embodiment.

In an embodiment, the seal exhibits a modulus of elasticity having at most half, in particular at most approximately 10%, of the modulus of elasticity for the wall. In particular, the seal can be a splashed soft seal. In an embodiment, the seal exhibits a plastic, in particular an elastomer and/or polyethylene (PE), in particular TPE, and includes thereof in a further embodiment. Likewise, the plastic can exhibit, in particular be, a thermoplastic and/or a duroplastic. In one embodiment, such seals can have a good sealing and/or stripping functionality without excessively detracting from the bolt movement.

In an embodiment, the seal exhibits a different plastic than the wall. The seal in particular can have or be made out of a different plastic than the wall. In this way, both components can be optimally tailored to their respective functions.

In an embodiment, the wall and seal, also accompanied in a further development by the wall and peripheral seal and/or overflow web, are materially bonded together via joint molding, in particular adhesively bonded and/or welded to each other. In a further embodiment, a bonding agent or adhesive can be arranged between the wall and seal for this purpose in the molding process. Additionally or alternatively, the wall and seal, also accompanied in a further development by the wall and peripheral seal and/or overflow web, can be materially bonded to each other via joint molding. To this end, one of the walls and seals can exhibit one or more recesses, in particular back cuts, into which corresponding projections of the other wall and seal positively engage, in particular from behind.

In an embodiment, the bolt is mounted by the seal, in particular so as to be one-dimensionally displaceable. Mounting is construed in particular as positively guiding the bolt, in particular reducing its degrees of freedom, preferably to a translatory degree of freedom. The bolt in one embodiment can move freely adjacent to the seal, in particular so as to advantageously be able to offset tolerances or kinematic balancing motions. This advantageously allows the same component to provide a sealing or stripping functionality along with a mounting and guiding functionality.

In an embodiment, the bolt exhibits a hooked side arm, which extends on an exterior side of the wall facing away from the cover, and can be actuated on a side lying opposite the passage opening. This enables an actuation at a location other than the passage opening that is more favorable for actuation purposes, for example with a hydraulic, pneumatic or electric actuator, in particular a servomotor, a control cable, a rod system or the like.

BRIEF DESCRIPTION OF THE DRAWINGS

The present invention will hereinafter be described in conjunction with the following drawing Figs., wherein like numerals denote like elements, and:

FIG. 1 is a sectional view of a trough module arrangement of a motor vehicle with a trough module according to an embodiment; and FIG. 2A and FIG. 2B is a method according to an embodiment for manufacturing a trough module on FIG. 1.

DETAILED DESCRIPTION

The following detailed description is merely exemplary in nature and is not intended to application and uses. Furthermore, there is no intention to be bound by any theory presented in the preceding background or summary or the following detailed description.

FIG. 1 shows a sectional view of a trough module arrangement for a motor vehicle with a trough module according to an embodiment. The trough module exhibits a wall 1 that includes a plastic, in particular PP GF20, and defines a trough with a tank opening. Only a left upper portion of the trough is discernible in the sectional view on FIG. 1. The wall 1 is secured to a body 4 of the motor vehicle, and sealed against the latter with a peripheral seal 5.

The trough can be sealed by a cover 8, which can be locked with a bolt 2. To this end, the bolt 2 passes through a passage opening 1.1 in the wall with an annular flange and a recess 8.1 in the cover 8. The bolt 2 on FIG. 1 is shifted to the left for unlocking, as denoted there by a motion arrow, and to the right for locking. In a modification not shown, the bolt can also positively interact with another back cut, in particular a hook, in the cover 8 instead of the recess 8.1.

The passage opening 1.1 incorporates a seal 3 that is made out of a different plastic than the wall 1, in particular out of TPE, and together with the peripheral seal 5 is molded, in particular injection molded, with the wall 1 by way of an overflow web 6.

The seal 3 is designed as an elastic or soft annular seal, and its inner edge tightly contacts the bolt 2 along its entire periphery, while also mounting or guiding the latter to enable its one-dimensional displacement (horizontal on FIG. 1). The inner edge is elastically expanded slightly by the bolt 2 passing through it.

FIG. 2A and FIG. 2B show a method according to an embodiment for manufacturing the trough module on FIG. 1. In a first procedural step depicted on FIG. 2A, the wall 1 is injection molded by means of a multipart injection mold 7.1, 7.2. The injection molded part 7.2 is then replaced by the injection molded part 7.3 to create an annular cavity, an overflow channel communicating therewith, as well as another cavity communicating therewith on the peripheral edge of the wall 1, in which the peripheral seal 5 and, by way of the overflow channel, the overflow web 6 and seal 3 are molded in a second shot depicted on FIG. 2B, joined with the wall 1 in the process.

The seal 3, peripheral seal 5, peripheral web 6 and wall 1 are here materially bonded with each other. In a modification not shown, they can additionally or alternatively also be positively joined together, in particular by forming projections in the molding process that engage back cuts of the wall 1 from behind (not depicted). The bolt 2 exhibits a hooked side arm 2.1, which is cut on FIG. 1, extends on an exterior side of the wall facing away from the cover 8 (left on FIG. 1) and can be actuated (not depicted) on a side opposite the passage opening 1.1 (right on FIG. 1). In this way, an actuator, control cable or rod system can also be placed remotely from the bolt 2.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing and exemplary embodiment, it being understood that various changes may be made in the function and arrangement of elements described in an exemplary embodiment without departing from the scope as set forth in the appended claims and their legal equivalents.

What is claimed is:

1. A trough module for attachment to a body of a motor vehicle that is sealable by a cover that is lockable by a bolt, comprising:

a wall;

a passage opening within the wall through which the bolt passes; and a seal incorporated within the passage opening that is molded with the wall.

2. The trough module according to claim 1, wherein the wall comprises a plastic.

3. The trough module according to claim 1, wherein the seal comprises a plastic.

4. The trough module according to claim 1, wherein the seal comprises a first plastic that is different from a second plastic, and wherein the wall comprises the second plastic.

5. The trough module according to claim 1, wherein the wall and the seal are materially joined together.

6. The trough module according to claim 1, further comprising a peripheral seal that is configured to seal the body, wherein the peripheral seal is molded by way of an overflow channel with the seal that is arranged in the passage opening.

7. The trough module according to claim 1, wherein bolt that is configured to lock the cover and substantially seal the trough module, and wherein the seal of the trough module tightly contacts the bolt.

8. The trough module according to the claim 1, wherein the bolt is mounted by the seal.

9. The trough module according to claim 7, wherein the bolt comprises a hooked side arm that extends on an exterior side of the wall facing away from the cover and actuated on a side lying opposite the passage opening.

\* \* \* \* \*